United States Patent [19]
O'Reilly et al.

[11] 3,944,143
[45] Mar. 16, 1976

[54] POWER TRAINS AND POWER TRAIN CONTROLS

[76] Inventors: Daniel W. O'Reilly; Joseph D. O'Reilly, both of Rte. No. 3, Goodhue, Minn. 55027

[22] Filed: Mar. 17, 1975

[21] Appl. No.: 559,134

Related U.S. Application Data

[63] Continuation-in-part of Ser. No. 412,690, Nov. 5, 1973, Pat. No. 3,887,153.

[52] U.S. Cl. ............... 239/650; 239/676; 239/680; 239/682; 222/178; 64/2 R; 74/501 R; 403/32
[51] Int. Cl.² A01C 19/00; E01C 19/20; F16C 1/02
[58] Field of Search .......... 239/676, 650, 662, 672, 239/679–682, 684; 74/501 R, 501 P; 403/32, 41, 145; 64/2 R, 3; 222/178, 334, 176

[56] References Cited
UNITED STATES PATENTS

| 1,879,114 | 9/1932 | Crumb et al. | 239/680 |
| 1,900,299 | 3/1933 | Oppenheim | 239/680 X |
| 2,263,748 | 11/1941 | Webb et al. | 239/678 |
| 2,518,802 | 8/1950 | Markel | 239/680 |
| 2,596,335 | 5/1952 | Kessler | 64/2 R |
| 2,619,860 | 12/1952 | Gray | 64/2 R X |
| 2,899,805 | 8/1959 | Huge | 64/2 R X |
| 2,949,753 | 8/1960 | Menoni | 64/2 R X |
| 2,950,609 | 8/1960 | Goodloe | 64/2 R X |
| 3,298,243 | 1/1967 | Geissler et al. | 74/501 |
| 3,656,638 | 4/1972 | Hutton et al. | 239/679 X |

Primary Examiner—Robert S. Ward, Jr.
Attorney, Agent, or Firm—Jacobson and Johnson

[57] ABSTRACT

A power train for heavy duty equipment comprising a flexible power cable and a sensing mechanism for monitoring the contraction of the cable as torque is applied to the cable and a member for decreasing the power to another control mechanism in response to the torque applied to the cable.

9 Claims, 14 Drawing Figures

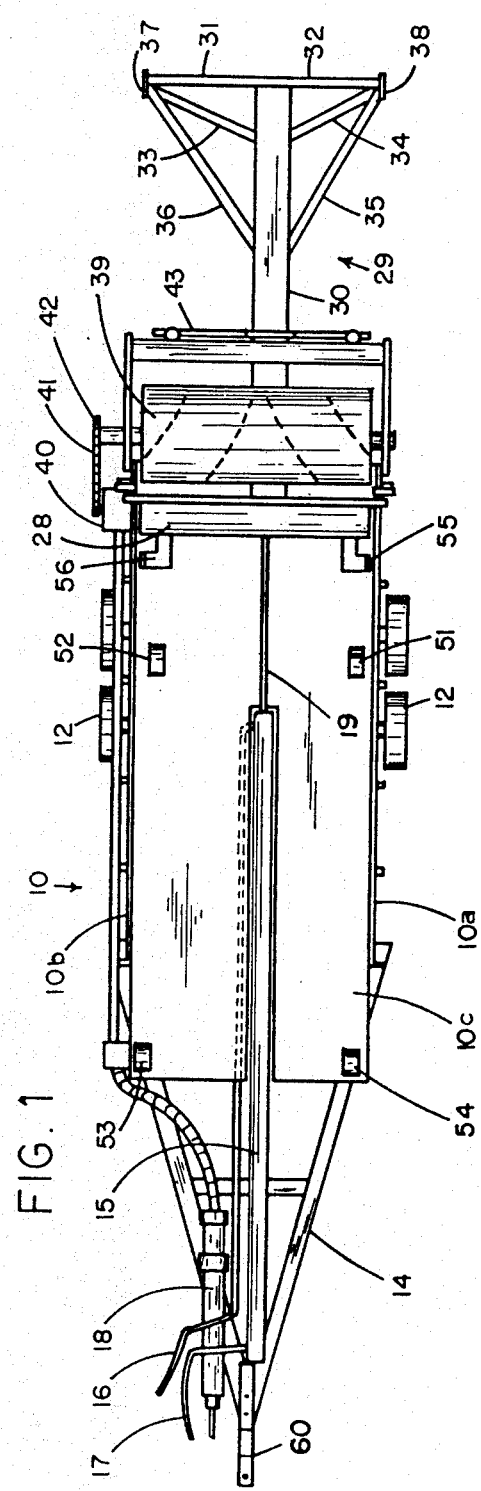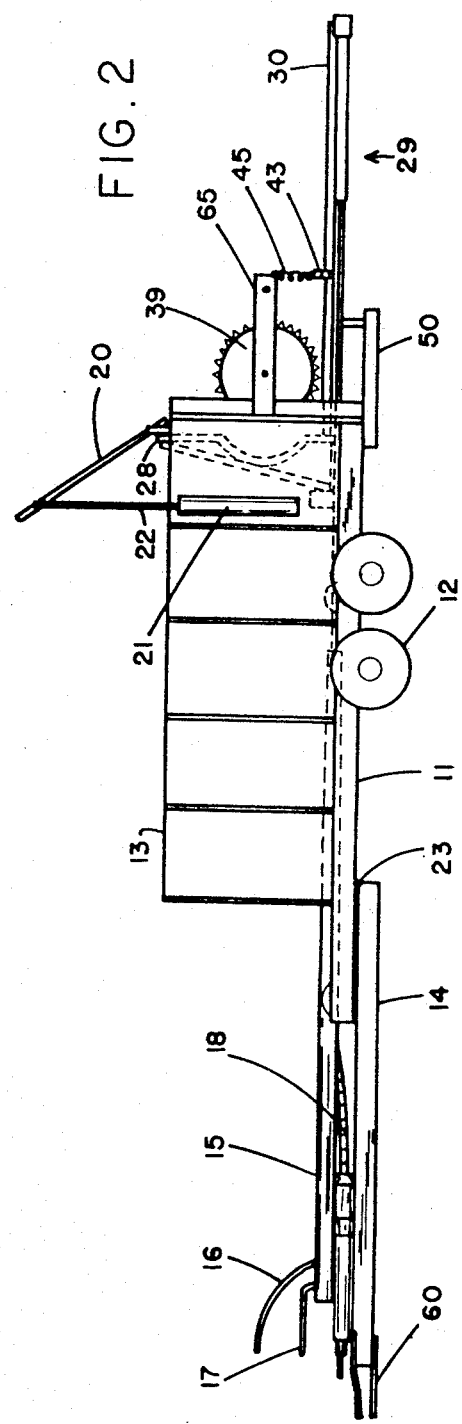

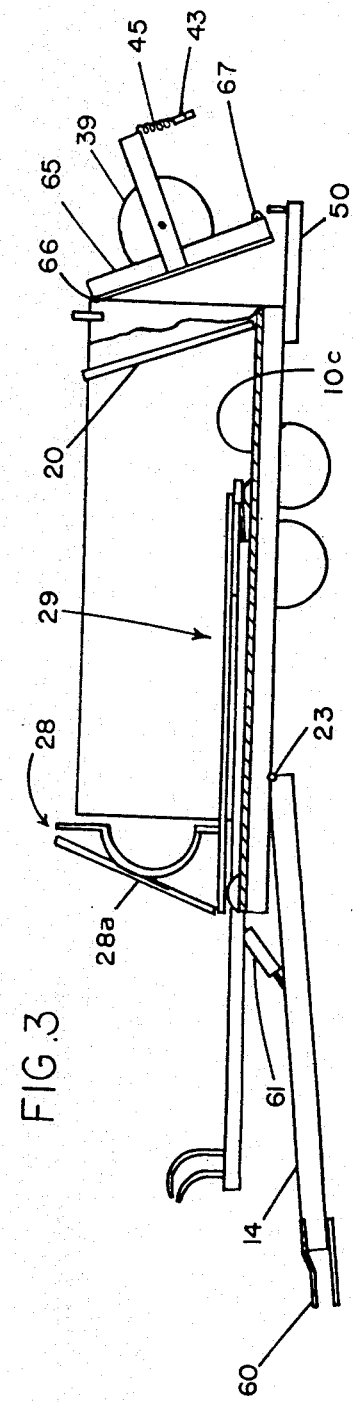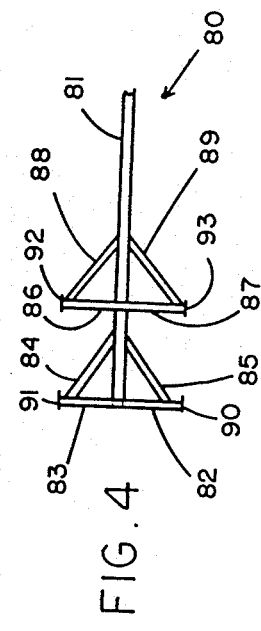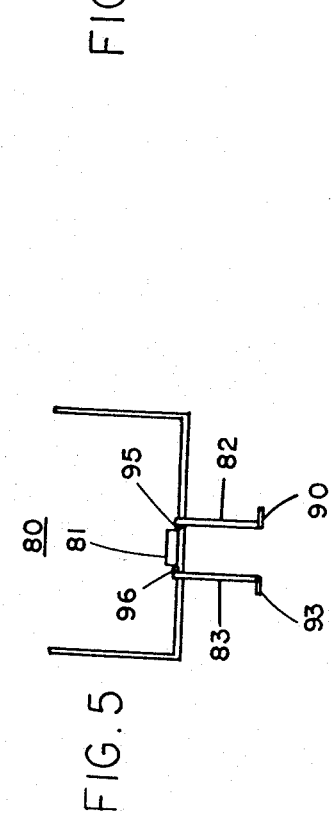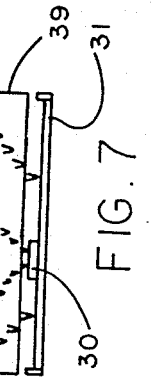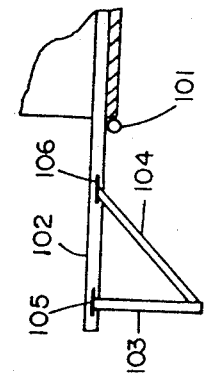

3,944,143

POWER TRAINS AND POWER TRAIN CONTROLS

CROSS REFERENCE TO RELATED APPLICATIONS

This application includes additional information on a flexible cable sensing mechanism for use with power equipment and is a continuation-in-part of our application titled "Attachments for Unloading Devices", U.S. Ser. No. 412,690, filed Nov. 5, 1973, now U.S. Pat. No. 3,887,153, issued June 3, 1975, which shows and describes a manure spreader that can be used with the present invention.

BACKGROUND OF THE INVENTION

1. Field of the Invention.

This invention relates generally to power trains and, more specifically, to flexible power trains in which the expansion and contraction of the power cable is used to control the amount of power applied to either the power train or a secondary source of power.

2. Description of the Prior Art.

The concept of unloading bulk materials with powered vehicles such as manure spreaders is well known in the art. Typically, the unloading units include some type of a power train to couple the power unit to the spreader and a pusher such as an endless chain or a cable actuated false end gate for forcing the bulk material to the one end of the box on the vehicle. For example, a typical manure spreader usually contains a pair of endless chains with slats therebetween which slide along the bottom of the spreader box. The slats pull the manure into a rotating beater which spreads the manure over the field. Still another embodiment of the manure spreader is shown in the Webb et al U.S. Pat. No. 2,263,748 which shows a sliding end gate pulled along the spreader box by a pair of cables. Similarly, another type of unloading device is shown in the Glass U.S. Pat. No. 3,211,308. The Glass patent also shows a system of cables for pushing material to the front of the forage box. These are typical of prior art unloading devices and boxes available and in use for unloading bulk material such as forage and manure.

One of the problems with virtually all of the box type spreaders is the buildup of material which occurs on the sidewalls of the spreader. The buildup occurs because it is extremely difficult to scrape the sidewalls of a spreader to get them clean. The buildup of material creates a problem in both the summer use and the winter use of the spreader. In the summertime, the buildup generally causes a decrease in the internal dimensions of the box which may result in sticking or binding of the pusher. In the winter time, the problem is more severe in that natural buildup is assisted by freezing which causes material to also freeze to the sides. When the weather warms up, some of the excess buildup will melt and run to the bottom of the spreader where it freezes again. This can freeze up the spreader rendering it virtually unuseable until the warm weather returns.

With all these prior art types of unloading devices, the spreader box is basically a wood or metal box for confining the bulk material. The present invention includes a unique power coupling for the spreader box which works particularly well with the unloading devices using a false end gate for pushing material out of the spreader. The power train comprises a sensing mechanism to determine if the torque on the train cable exceeds a predetermined level and a member to reduce the power applied to the power train or a secondary source of power if the torque exceeds a predetermined level.

Other features have been included in the spreader provide means for adjusting the horizontal position of the load to eliminate problems of spreading manure on slopes.

Another feature of the invention is that the spreader with the side wall attachments can better accommodate loose manure as well as manure containing large amounts of bedding.

Another feature of the invention is the use of a hydraulic system to power the unloading of the manure.

Another feature of the invention is the means for preventing the unit from freezing during cold weather.

One of the problems occurring with remotely powered units such as the aforedescribed spreaders is the variation in load that occurs under varying conditions. For example, in a manure spreader, a load of frozen material or heavy material will produce a large force on the beater. If the force becomes too large, it may break the beater. The present invention provides a means for sensing when the load becomes too heavy and for reducing the rate of feed of the bulk material into the beater.

One of the prior art solutions of eliminating problems of stress on equipment is to use a slip clutch which disengages the power shaft if the stress exceeds a predetermined value. Such a device is shown and described in the Yergens U.S. Pat. No. 2,626,000. However, such devices only disengage and do not provide a compensating or controlling force as does the present invention. Thus, the present invention is well suited for utilization with the type of spreader shown and described in FIGS. 1 – 9.

BRIEF SUMMARY OF THE INVENTION

Briefly, the present invention comprises a flexible power train assembly having a power cable that expands and contracts in response to the torque applied to the cable, a sensing mechanism for determining the expansion and contraction of the cable and a member for reducing the power applied to a secondary power source in response to the torque applied to the power cable.

BRIEF DESCRIPTION OF THE DRAWINGS

Referring to the drawings, FIG. 1 shows a top view of our spreader;

FIG. 2 shows a side elevation view of our spreader;

FIG. 3 shows a side elevation view of our spreader with the side cut away to reveal the functional internal parts of our spreader;

FIG. 4 is a top view of one embodiment of our pusher member which prevents compaction of the bulk material;

FIG. 5 is an end view of FIG. 4 showing the folding arms in one embodiment of the pusher member;

FIG. 6 shows the guard members for repositioning the foldable pusher arms;

FIG. 7 shows the arrangement of the beater teeth with respect to our pusher member;

FIG. 11 shows the sensing mechanism of our invention in the expanded position.

DESCRIPTION OF THE PREFERRED EMBODIMENT

Figure 9:
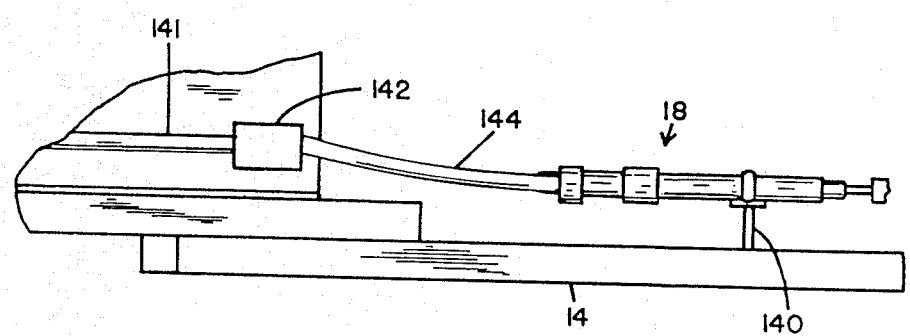
FIG. 9 shows the mounting of the flexible drive shaft on the frame of our manure spreader.
Figure 10:
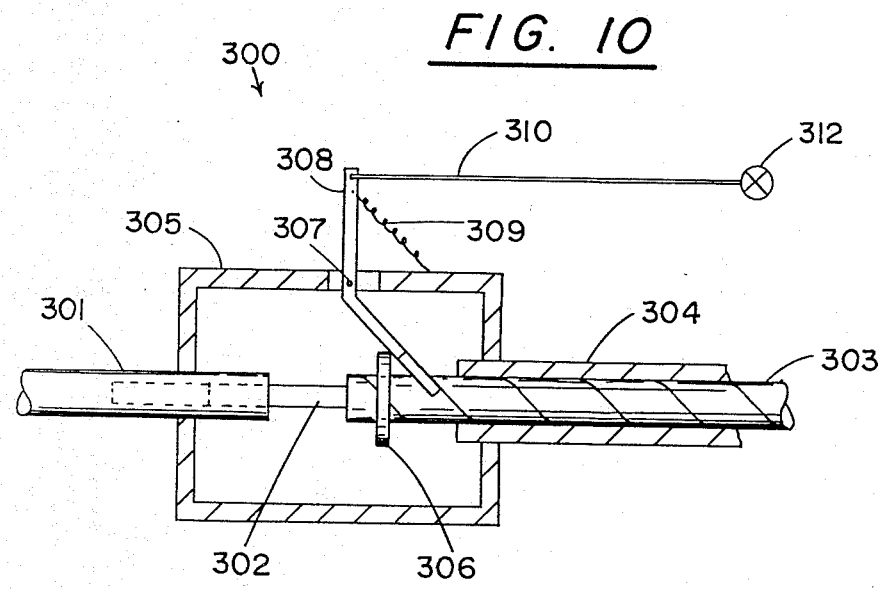
FIG. 10 shows the sensing mechanism of our invention in the contracted position.
Figure 10A:
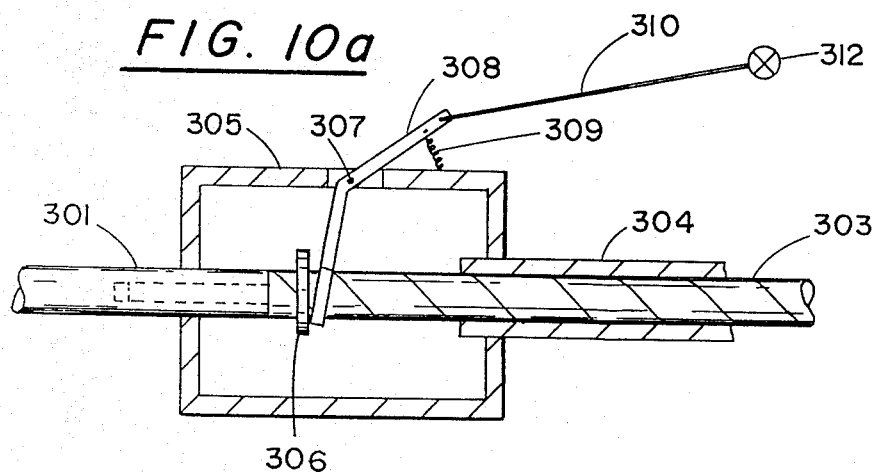

Referring to FIG. 10 and FIG. 10a, reference numeral 300 identifies the heart of the sensing mechanism which is used with the cable and cable housing shown and described hereinafter with respect to FIGS. 8 and 9 and the spreader shown and described with respect to FIGS. 1 – 7.

Reference numeral 301 designates the power shaft which is connected to the beater 39 of spreader 10 (FIG. 1). While the present invention is shown and described with respect to a manure spreader, it will be understood our sensing and flexible drive power mechanism is suitable for use with other equipment also. Shaft 301 has a splined recess therein for receiving a spline shaft 302 which is fastened to flexible stranded cable 303. Flexible stranded cable 303 turns in an oil-filled housing 304 which connects with sensing mechanism housing 305. The first end of flexible cable 303 which is not shown is mounted to restrain lateral movement of the first end of cable 303 within the housing while allowing the second end of cable in sensing mechanism 305 to expand and contract in response to the torque applied thereto. Located on the second end of flexible cable 303 is a sensing collar 306 that forms engagement with a Y-shaped pivot member 308 which pivots about pivot pin 307. A spring 309 holds member 308 in pressure contact with collar 306. An arm 310 connects pivot member 308 to a hydraulic valve 312 which, in the present invention, connects to the hydraulic cylinder 15 shown and described hereinafter with respect to FIG. 1.

In normal operation of a flexible cable mechanism, there is a certain amount of contraction of the cable in proportion to the torques on the cable. With a small or light load, the cable may be fully extended as shown in FIG. 10a. However, as the torques or load increases, the cable contracts as shown in FIG. 10. Thus, contraction causes arm 308 to pivot about point 307. Arm 308 is, in turn, connected to fluid valve 312. As member 310 moves as shown in FIG. 10, it closes valve 312. With valve 312 closed, the amount of hydraulic fluid directed to hydraulic cylinder 15 is decreased thus slowing down the rate of feed of bulk material into the beater.

In the present invention, the amount of torque on the flexible drive mechanism is sensed or measured and a signal is sent not to reduce the torque on the flexible drive mechanism but to reduce the hydraulic pressure in hydraulic cylinder 15 which, in turn, will reduce or stop the feeding of material into beater 39. As the amount of material being fed into beater 39 decreases, it allows the beater to dislodge or slowly remove any hard materials without damaging either the beater or the spreader. Once the problem has been corrected, the spreader returns to normal operating conditions.

While this sensing and control apparatus has an ideal application for a hydraulic power spreader, the present invention is also suitable for other power equipment such as combines or corn pickers or the like. However, in these units the speed of the vehicle may be controlled rather than the discharge of material. In addition, while a fluid valve is shown as being controlled in response to the motion of the cable, a mechanical or electrical device could also be used in conjunction with the member for sensing the motion of the cable.

Figure 3A:
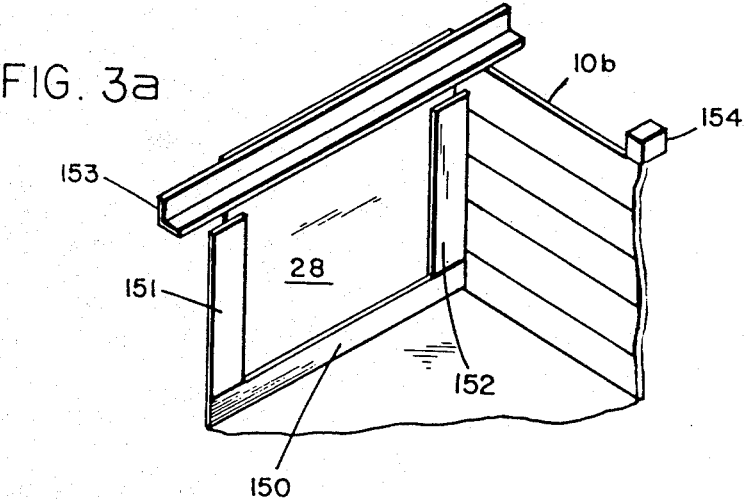
FIG. 3a is a perspective view of our end gate and side wall scrapers.
Figure 3B:
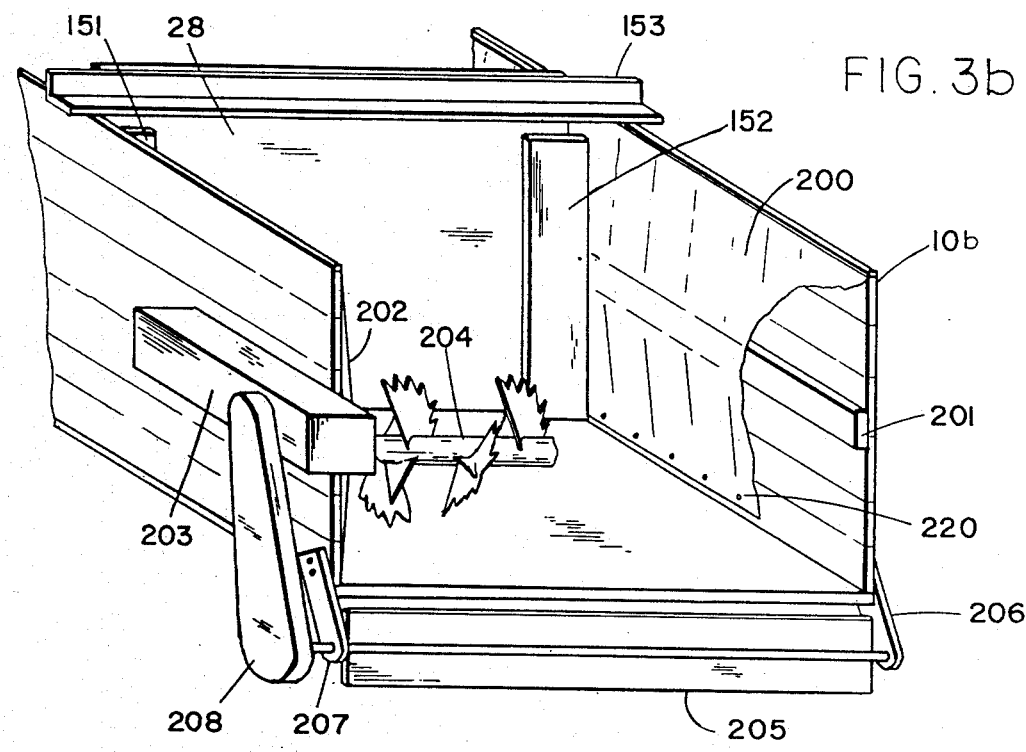
FIG. 3b is a perspective end view of a spreader box having my flexible side wall attachments.
Figure 3C:
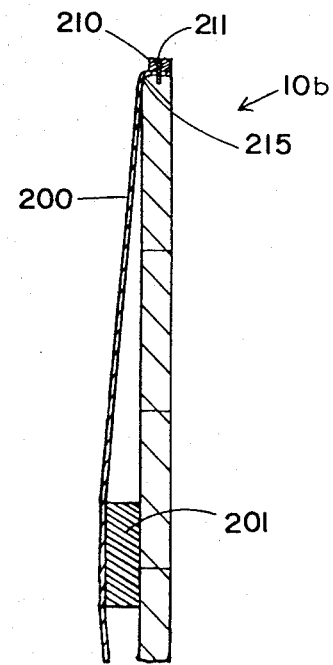
FIG. 3c is an end view of a portion of the spreader box and our side wall attachment member.

Referring to FIG. 3b and FIG. 3c of the drawing, reference numeral 10b identifies one side wall of a spreader box. Attached to side wall 10b is our flexible side wall attachment member 200 which is shown held in a spaced relationship from spreader side wall 10b by a central compressible or resilient member 201. Typically, compressible member 201 may be closed cell sponge rubber, however, no limitation is intended thereto. The top of flexible member 200 is held against the top edge of side wall 10b by a strip 210 and screws 211. In the preferred embodiment, the top of flexible sheet 200 is tightly held against the top of side wall 10b to prevent moisture or material from falling between flexible side wall attachment 200 and side wall 10b. The bottom of our flexible side wall attachment member 200 is fastened to side wall 10b by spaced members such as flathead nails or the like. The purpose of the spaced members is to provide for air openings at the bottom of the flexible side wall attachment member which allows air to escape from between side wall attachment member 200 and side wall 10b. Similarly, located on the opposite side of the spreader is another flexible side wall attachment member 200 which performs an identical function as side wall attachment member 200 and therefore will not be described herein. Similarly, the ends of side wall attachment member are fastened to allow air to escape as the pusher passes over the flexible side wall attachment member. Flexible side wall attachment member 200 is held in a spaced relationship from spreader side wall 10b by a compressible or resilient member 201; however, it is not necessary for the invention to have a compressible member 201 but it is preferred to have a member that will hold flexible side wall attachment in a somewhat spaced relationship from side wall 10b.

In operation of the spreader, the pusher member or sliding false end gate 28 includes a non-abrasive scraper member 151 on one side and a similar non-abrasive scraper member on the opposite side which are forced along the side wall attachment members 202 and 200. Scraper members 151 and 152 are made from flelxible material such as belting, plastic, or the like, and do not contain any sharp edges which would catch on the flexible side wall attachment members. The flexible side wall attachment member is preferably made from a plastic polymer material such as polyvinyl chloride or polyethylene. However, no limitation to these materials is intended.

The present invention prevents the buildup of material on the spreader side wall by the coaction of members 152 and 151 and fleixble side wall attachment members 200 and 202. For example, as flexible member 152 moves back and forth along side wall attachment member 200, it produces both a rippling action and a scraping action along the side wall attachment member 200. This combined action has been found to be extremely effective in removing any residue or materials which would cling to the side of the box. While my side wall attachment members can be rigidly mounted to the side walls of the spreader, it has been found there is a better cleaning action if there is some slack or looseness in the flexible sheet as this produces a rippling action as well as a scraping action.

One of the problems with the conventional spreader boxes utilizing false end gates is a tendency of the center of the boxes to bow outward. If the box bows outward, a conventional straight edge scraper on the false end gate cannot maintain the side walls of the spreader clean. In contrast, the present invention maintains the spreader side wall members clean to prevent build up of materials on the spreader side walls even if the box bows out slightly. More specifically, one of the problems with the prior art spreader devices including those that use chains for unloading the material is that build up occurs along the side wall of the spreaders. During winter use, it freezes to the spreader side wall. As the material continues to freeze to the spreader box, the box gets smaller and smaller to create binding problems with the unloading device. However, the more important problem is that if the weather warms up on a particular day, the build up on the sides may partially melt and run down to the bottom of the spreader where it freezes. When it freezes to the bottom of the spreader, it usually freezes the pusher gate or unloading chains to the spreader. If one were to engage the spreader with the unloading device frozen, one would break the unloading device. The present invention solves this problem by eliminating the build up along the sides by use of the flexible members 200 and 202 located attached to the side wall member of the spreader.

Another feature of the present invention is a splash beater 205 which is powered from gear box 203 by a chain located under guard 208. Splash beater 205 is held in position by brackets 207 and 206. The splash beater 205 is powered from the same power source as main beater 204. The purpose of splash beater 205 is to handle any loose materials coming out of the unloading device. For example, the loose or liquid type materials tend to flow out underneath the main beater, however, with the present invention, the liquid or semi-liquid type of material will fall onto the rotating splash beater 205 which will disperse he material over the field as well as immediately under the spreader.

In the preferred embodiment, the material used for flexible side wall attachment member can be polyvinyl chloride or polyethylene. We have found a minimum thickness approximately 3/32 inches has worked extremely well for these type of materials. The polymer plastics are preferred because of their slipperiness, however, other flexible materials can be used which are able to withstand the environmental conditions normally encountered in winter and summertime use of the spreaders.

While the heart of the present invention is a flexible side wall attachement member for use with various types of unloading devices, the invention is best utilized with the spreader shown and described hereinafter.

With reference to the remaining drawings, the preferred type of spreader for use with the present invention will be described more specifically. FIG. 1 and FIG. 2, reference numeral 10, generally designates a bulk loading device in which the preferred embodiment is a manure spreader. While the invention is described as an attachment to side walls of a manure spreader, it is apparent that the side wall attachments for my spreader can be used for unloading materials which have the bulk characteristics of manure as well, for example, lime or forage material could also be unloaded with our spreader. The spreader comprises a main frame 11 which has wheels 12 mounted thereon for rotatably supporting spreader 10 thus allowing spreader 10 to be transported over open fields. Pivotally attached to main frame 11 by pivot bolts 23 is a front frame 14 which contains a hitch 60 for connection to a pulling device such as a farm tractor. Spreader 10 includes a box comprised of side walls 10a and 10b, a bottom 10c, and a pair of end gates 20 and 28. Preferably, the prior art boxes are made from wood to prevent rapid freezing of bulk material to the box which occurs with the use of metal boxes. In an alternate embodiment of the invention, we use an inside and an outside wood box with a layer of insulation therebetween to lessen the opportunity for the manure to freeze to the side walls.

In the loading position, end gate 28 is located in the front of the spreader 18; however, in FIG. 1, end gate 28 is shown in the extended position or unloaded position. A rear end gate 20 is provided which is powered by hydraulic cylinder 21 and extendible arm 22. Rear end gate 20 prevents the manure from falling into the beater during the loading process. When the spreader is in operation, end gate 20 is raised to the position shown in FIG. 2 by applying a signal to hydraulic cylinder 21 to cause arm 22 to become extended. In order to simplify the drawing, only one cylinder 21 is shown, however, in practice it is preferred to have one cylinder on each side of the spreader. Also, in an attempt to simplify the drawings, the end gate 20 and hydraulic cylinders have been omitted from FIG. 1.

The beater which contains teeth or spikes for spreading the manure is designated by reference numeral 39 and is powered from a tractor through a power take-off shaft 18, a gear box 40, a chain drive 41 and a spur gear 42 located on the shaft supporting beater 39.

Referring to FIGS. 1, 2 and 3, the power mechanism for unloading the bulk material from the box comprises a hydraulic cylinder 15 which is powered through hydraulic line 16 and 17. The advantage of our hydraulic cylinder is that the motion and the pusher members can easily and quickly be controlled by the tractor operator as well as provide a uniform unloading device. The hydraulic cylinder 15 contains an extendible rod 19 that attaches to our pusher member. Bottom 10c contains an opening so that a portion of cylinder housing 15 and 19 can extend therethrough so rod 19 can be attached to pusher member 29. Attachment to pusher member 29 is preferably made at the end of member 30 by a clevis or pin. Thus, in the event of breakdown the load can be unloaded by extending rod 29. The purpose of the opening around cylinder 15 is to allow any material behind the end gate to fall through the opening when the end gate is returned to a front position. Pusher member 29 actually comprises two members which are fastened together and simultaneously powered by hydrualic cylinder 15. The first pusher member is end gate 28 which extends upward in a vertical position to push on the bulk material and the second member is pusher member 29 which extends in a horizontal direction into the bulk material in spreader 10. End gate 28 is shown with a curved section and a covering shroud 28a to better facilitate the unloading of the bulk material as the end gate approaches the beater 39. In the extended position of end gate 28, the lower edge of end gate 28 extends slightly beyond the lip of the box to insure that all the bulk material is pushed out of the box during the unloading operation.

In FIGS. 1 and 2, the pusher members are shown in the extended position while in FIG. 3 the pusher members are shown in the retracted position. Second pusher member 29 comprises a straight section 30, a pair of arms or wing bars 31 and 32 that extend out from member 30. Arms 31 and 32 are braced for support by members 33, 36, 34 and 35, respectively. Located at the end of arm 31 is a guide shoe 37 and similarly located at the end of arm 32 is a guide shoe 38. Also located on the end gate 28 are guide shoes 55 and 56. The purpose of guide shoes is to maintain the orientation of the pusher members with respect to the spreader box by engaging the side walls of the spreader 10 and thereby prevent twisting of the pusher member when hydraulic cylinder 19 is actuated. It is this second pusher member 29 in conjunction with end gate 28 which extends into the bulk material and has been found to prevent compaction of the bulk material as well as prevent the spillage of material over the sides of the box. The operation is not fully understood but it is believed that the support members tend to direct the bulk material away from the sides of the spreader thus reducing the side wall friction and eliminating the spillage over the sides. In addition the center member 30 and the arms and supports also partially support the load of bulk material.

Located within the box spreader 10 is a set of antifreeze blocks 51, 52, 53, and 54. These blocks which are small ramps provided for elevation of the pusher members during storage. The blocks lift and maintain the pusher mechanism off the floor of the spreader so that the pusher members 28 and 29 cannot freeze to the bottom of the spreader. The only part of the pusher mechanisms which can freeze are those points in contact with the antifreeze blocks; however, since the surface area is quite minimal, one can easily free the pusher members by applying a signal to power cylinder 15.

Referring to FIG. 3a, reference numeral 28 indicates the end gate and reference numeral 10b indicates one side of the box. This detail reveals two additional features of the invention, namely, scrapers 150, 151 and 152. These scrapers are flexible enough to prevent binding of end gate against the walls of the box but stiff enough to bend backward and not allow the bulk material to slip past end gate 28. A typical suitable material is rubber, belting, plastic, or the like.

Located on top of end gate 28 is a channel iron 153 which serves a dual function. The first function is to scrape the top edges of the box to remove any bulk material that falls thereon. The second purpose is to coact with stop 154 to prevent end gate 28 from accidentally engaging beater 39.

Referring to FIG. 3, the operation of the unit will become more apparent. In FIG. 3, the false end gate 28 or first pusher member is shown in its front position storage position. In the storage position, the pusher members are resting on the antifreeze blocks which comprise ramped blocks. However, prior to loading the pusher members are displaced slightly rearward so that the bottom of the pusher members rest on the bottom 10c of spreader 10. This is called the loading position. It is apparent that in the loading position, the second pusher member 29 is located about in the middle of spreader 10. In loading, the bulk material is dumped on top of second pusher member 29. The bulk material is held in confinement by false end gate 28, the side wall 10a and 10b and the rear end gate 20. When the spreader has been loaded and ready for spreading, one can raise end gate 20 so that the bulk material can be forced into beater 39. While we show a rear end gate 20, it is apparent that an end gate need only be used for bulk materials which are sloppy and would tend to spill out of the spreader during loading.

Further features of the spreader which are shown in FIG. 3 are the concept of our break-away beater housing 65 which is pivotally fastened to spreader 10 by pivot member 66. The bottom of beater housing 65 is held in contact with the rear of spreader 10 through a set of break-away pins 67 which are located on both sides of spreader 10. FIG. 3 shows the break-away pin broken. The purpose of break-away pin 67 is so that if there should be hard material or frozen material in the spreader, the pusher members will not break the beater by forcing the frozen material into the beater but instead would break the break-away pins thus allowing the beater to swing free without any damage thereto. In addition, the pivot members may be removed to allow the use of the box for unloading without spreading.

Another aspect of our spreader shown in FIG. 3 is the tiltable bed comprised of frame 11 and frame 14 which has a hydraulic cylinder 61 that connects to frame 11. By extending or retracting cylinder 61, one can tilt the bed of spreader 10 to the desired position. Thus, the operator can adjust the spreader for going downhill or uphill.

Another feature of the spreader shown in FIGS. 1, 2, and 3 is guide or support 50 for pusher member 29. Support 50 provides vertical support to arm 30 as it extends beyond the rear of the spreader. In addition, we provide a scraper 43 which fastens to frame 65 through a pair of helical springs 45. The helical springs hold the edge of scraper 43 against the top portion of pusher member 29 as well as allows the scraper member to flex inward or outward. That is, as pusher member 29 moves outward, helical springs 45 allows scraper 43 to flex rearward as well as upward. This enables scraper 43 to always maintain pressure contact with the member 30 and thereby scrape any loose material off member 30. Member 30 has been shown as flat with a top parallel to bottom 10c of spreader 10. However, in an alternate embodiment, member 30 has a cross sectional shape of an isosceles triangle to allow the bulk material to slide off by gravity.

Referring to FIG. 4, an alternate embodiment of my wing bars or second pushing member 29 is designated by reference numeral 80. Wing bar 80 is substantially the same as the pusher shown in FIG. 1 except that the member 81 contains a pair of wing bars or pushing members which extend into the bulk material. The unit comprises arms 81 and 86, angle supports 88 and 89 and arms 82 and 83 and angle supports 84 and 85. Both of these members have guide shoes as indicated by reference numerals 91 and 92, 90 and 93. Thus, a modification of the spreader is the use of two wing bars for extending into the bulk material to provide more contact with the bulk material.

In addition to the modification of the wing bars by use of two members, FIG. 5 shows an additional modification of pivotal mounting arms 82 and 83 to member 81 by hinges 95 and 96. With this embodiment, arrms 82 and 83 fall downward after having passed under the beater thus eliminating the need for a scraper.

A reference to FIG. 6 shows how a wing bar would appear in a side view. Note, arm 103 and angle support 104 are fastened by hinges 105 and 106 to member 102 which could be substituted for member 30. Also, a roller guide 101 is located at the rear of the spreader 10 to engage angle support arm 104 to gradually lift the wing bar up to the horizontal position for pulling into the spreader.

FIG. 7 shows an end view of the wing bars and beater to illustrate that the teeth are shorter in the region that passes over member 30. This allows one to maintain a uniform minimum clearance under the entire length of the beater.

Figure 8:
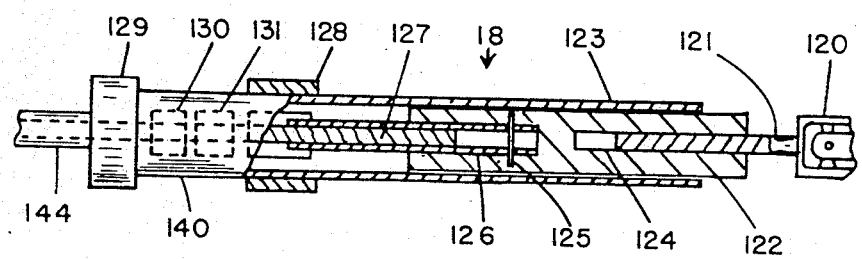
FIG. 8 shows a cross-sectional view of our flexible drive shaft mechanism.

Referring to FIG. 8, my novel flexible drive mechanism 18 from the tractor to spreader beater 39 is shown in cross section. The drive unit comprises a rigid shaft 141 that runs through a transfer box 142, a wire cable 127 which runs through a curved housing 144 connecting to unit 18 which is pivotally mounted to frame 14 by support 140. More specifically, the unit 18 comprises a housing 123, a conventional power take-off shaft 120, a spline shaft 121 for fitting into a splined opening 124 located in member 122. Splined shaft 121 is allowed to slide within member 122 and thus compensate for any variations in hookup of the spreader to the tractor. Located on the other end of member 122 is another opening which contains a pipe 126 which is pinned to member 122 by a pin 125. Located inside pipe 126 is a portion of my flexible steel wire cable 127 which is brazed to the pipe to form integral engagement with pipe 126. The flexible cable 127 extends through a section of a flexible hose 140 comprised of a sleeve with a coil spring on the outside and into housing 144 which fastens to the gear box 142. Located within the flexible hose section 140 are bushings 130 and 131 which prevent the flexible wire cable from rubbing against flexible hose 140. In addition, one may fill the hose with a lubricant such as oil to continually lubricate the flexible cable.

The purpose of the flexible mechanism 18 as shown in FIG. 8 is to allow for contraction of the cable as one applies the load by allowing member 122 to slide within the housing 123. That is, as one applies torque to the power take-off shaft 121, flexible cable 127 tightens up thus causing the cable to shorten. Thus, the present drive mechanism allows for this contraction or shortening of the cable without providing an undue torque to the housing itself. We have found that this arrangement will operate exceedingly well under rpm conditions of as high as 1,000 rpm and thus replace conventional universal type connections.

When used in conjunction with our sensing mechanism, member 122 would be restrained from lateral movement within housing 123 and the other end of the cable would be allowed to expand and contract within housing 142. Typically, housing 142 would contain the sensing mechanism 300 shown in FIGS. 10 and 10a.

One other feature of my flexible drive shaft is that we have discovered to utilize a flexible shaft under load conditions of 25 to 30 horsepower, it is necessary to have a flexible cable in which the twist of the strands of the cable is in the same direction as the lay or twist of the strands around the core of the cable. Typically, we can use a 1 flexible shaft to transmit up to 30 horsepower in contrast to available prior art flexible shafts which are unable to handle these horsepower requirements without unraveling.

In still another embodiment of the present invention the sensing mechanism can be used to deliver a signal to a warning device or gauge to thereby allow an operator to determine the amount of torque on the flexible cable.

Thus, it will be apparent that our machine is much simpler and easier to repair and adjust than prior art spreaders. For example, if one wishes to adjust the rate of discharge of the bulk material by controlling the speed of the end gate, all one has to do is adjust the amount of hydraulic fluid supplied to hydraulic cylinder 15 by either inserting a different orifice into the hydraulic line or use available supply hydraulic valve.

We claim:

1. A flexible drive mechanism operable for powering a device by transmitting torque around a bend comprising:
   an input member for ataching a first source of power;
   a housing for rotatably supporting a flexible cable;
   a flexible cable mounted in said housing, said flexible cable operable for flexing at least once per revolution and transmitting a torque during the flexing; said cable comprised of strands which simultaneously flex and tighten around one another during the transmission of torque to thereby produce a displacement of said cable in said housing in response to the torque applied thereto.

2. The invention of claim 1 wherein said flexible drive mechanism includes a member for sensing the displacement of said cable in said housing.

3. The invention of claim 2 wherein said member for sensing the displacement comprises a pivotal mounted member and said flexible cable includes a collar attached thereto for engaging said pivotal mounted member.

4. The invention of claim 2 wherein said member for sensing the displacement of said cable includes means for controlling the amount of power deliverable from a second source of power.

5. The invention of claim 3 wherein said device comprises a spreader having a beater, said beater being powered by said flexible cable, said spreader further having a hydraulic cylinder and pusher member powered from said second source of power for forcing material into said beater, said hydraulic cylinder responsive to a signal from said sensing mechanism so that a high torque on said flexible cable produces a control signal to said hydrualic cylinder to thereby change the power applied on said pusher member.

6. The invention of claim 1 wherein said flexible drive mechanism includes means for allowing contraction of said cable in said housing.

7. The invention of claim 6 in which the flexible cable comprises two sets of strands, the first set of smaller strands twisted to form a cable of lesser diameter than the flexibe cable, and a second set of strands formed from said first set of strands.

8. The invention of claim 7 wherein the twist of the first set of strands is the same direction as the twist of the strands formed from said first set of strands.

9. The invention of claim 8 including a member for pivotal mounting said flexible drive mechanism to the form of a towed vehicle.

* * * * *